(12) United States Patent
Souza et al.

(10) Patent No.: US 8,745,144 B2
(45) Date of Patent: Jun. 3, 2014

(54) PERSISTING CONTACT INFORMATION IN MAILBOX

(75) Inventors: Jeremy de Souza, Seattle, WA (US); Mayerber Carvalho Neto, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 13/246,866

(22) Filed: Sep. 28, 2011

(65) Prior Publication Data

US 2013/0080546 A1 Mar. 28, 2013

(51) Int. Cl.
*G06F 15/16* (2006.01)

(52) U.S. Cl.
USPC ............ 709/206; 709/202; 370/232; 455/418

(58) Field of Classification Search
USPC ................... 709/206, 202; 370/232; 455/418
See application file for complete search history.

(56) References Cited

U.S. PATENT DOCUMENTS

| | | | |
|---|---|---|---|
| 7,627,608 B2 | 12/2009 | Strandell et al. | |
| 8,032,559 B2 * | 10/2011 | Ring et al. | 707/792 |
| 8,295,205 B2 * | 10/2012 | Mazor et al. | 370/259 |
| 2007/0064920 A1 | 3/2007 | Ruckart | |
| 2008/0114716 A1 | 5/2008 | Mock | |
| 2008/0177796 A1 | 7/2008 | Eldering | |
| 2008/0316925 A1 * | 12/2008 | Dolin et al. | 370/232 |
| 2009/0043844 A1 | 2/2009 | Zimmet et al. | |
| 2009/0083367 A1 * | 3/2009 | Li et al. | 709/202 |
| 2009/0177744 A1 | 7/2009 | Marlow et al. | |
| 2010/0057859 A1 * | 3/2010 | Shen et al. | 709/206 |
| 2010/0330972 A1 * | 12/2010 | Angiolillo | 455/418 |

OTHER PUBLICATIONS

"Synchronoss Network Address Book", Retrieved at <<http://www.synchronoss.com/doc/Synch%20Network%20AddressBook%20DS%20072010.pdf>>, Retrieved Date: Jul. 19, 2011, pp. 2.*
"WebAsyst Address Book 1 Review", Retrieved at <<http://webasyst-address-book.webasystllc.softalizer.com/>>, Retrieved Date: Jul. 20, 2011, pp. 3.

* cited by examiner

*Primary Examiner* — Michael C Lai
(74) *Attorney, Agent, or Firm* — Louise Bowman; Brian Haslam; Micky Minhas (57) ABSTRACT

Multiple contacts are aggregated through contact linking into a unified profile view addressing conflicting data, duplicates, etc. By persisting contact information in a server-maintained mailbox that is used as a storage model and as the contact linking system, roaming solution across form factors (mobile, slate, PC, etc.) can be provided with higher accuracy and fewer false positives. By centralizing the solution in the mailbox, redundancy and manual work by the user is substantially reduced. Contact data, communication heuristics, corporate directory meta-data, instant messaging data, etc. can be leveraged in linking contacts.

18 Claims, 6 Drawing Sheets

PERSISTING CONTACT INFORMATION IN MAILBOX

BACKGROUND

Contemporary communication systems enable users to have a number of identities over various systems such as enterprise emails, personal emails, social networking exchanges, and comparable ones. Each of these systems may generate contact lists based on automatic processing of exchange information and/or manual input. A structure and content of contact information for distinct communication systems may be different depending on their infrastructure. Thus, a user may have a plurality of contact information for the same contact stored in each communication system they are associated with.

Increasingly, other applications are becoming capable of providing access to multiple communication systems for a user. For example, an electronic mail exchange application may be configured to send and receive emails from a variety of systems for a user managing the user's identities automatically. Because each communication system tends to have its own contact lists, it is a challenge for users to manage multiple contacts while using multiple communication clients. Not only can contents of contact information from different sources for the same person or entity be distinct, each source may have a different structure/format for their contact data. Thus, aggregating contact information from different source into a single presentation may present structural challenges. Furthermore, when aggregation is performed at a presentation layer such as at a client device or application, changes may be lost when connection to the different data sources is lost or in response to client device/application based events.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to persisting contact information in a mailbox. Multiple contacts may be aggregated through contact linking into a unified profile view addressing conflicting data, duplicates, etc. By using a server-maintained mailbox as a storage model and as the contact linking system, roaming solution across form factors (mobile, slate, PC, etc.) may be provided with higher accuracy and fewer false positives. By centralizing the solution in the mailbox, redundancy and manual work by the user may be substantially reduced. Furthermore, contact data, communication heuristics, corporate directory meta-data, instant messaging data, etc. may be leveraged in linking contacts. In some embodiments, contacts may be handled similarly to email conversations, where linked contacts in aggregate are equivalent to person objects, which is analogous to email conversations that are email messages in aggregate.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, contact information may be persisted in a logic person object within a mailbox by a communication application. The application may aggregate contact information retrieved from different data sources to a unified contact view using a logic person object persisted in a mailbox. Linked contacts may also be persisted in the mailbox allowing bidirectional edits.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a contact may be information with elements such as identifiers to enable communication with another user. Contact information may include the user's name, email address(es), telephone number(s), user-id(s), address(es), and similar identifiers. Contact information may also include dynamic information such as a user's presence information including availability and location. Contact information may be retrieved from an external or internal data source. A logic person object may aggregate the linked contact data into a singular entity.

Throughout this specification, the term "server" generally refers to a computing device executing one or more software programs typically in a networked environment. However, a server may also be implemented as a virtual server (software programs) executed on one or more computing devices viewed as a server on the network. Similarly, a "client" may refer to a computing device enabling access to a communication system or an application executed on a computing device enabling a user to access a networked system such as a social networking service, an email exchange service, and comparable ones. More detail on these technologies and example operations is provided below.

Figure 1:
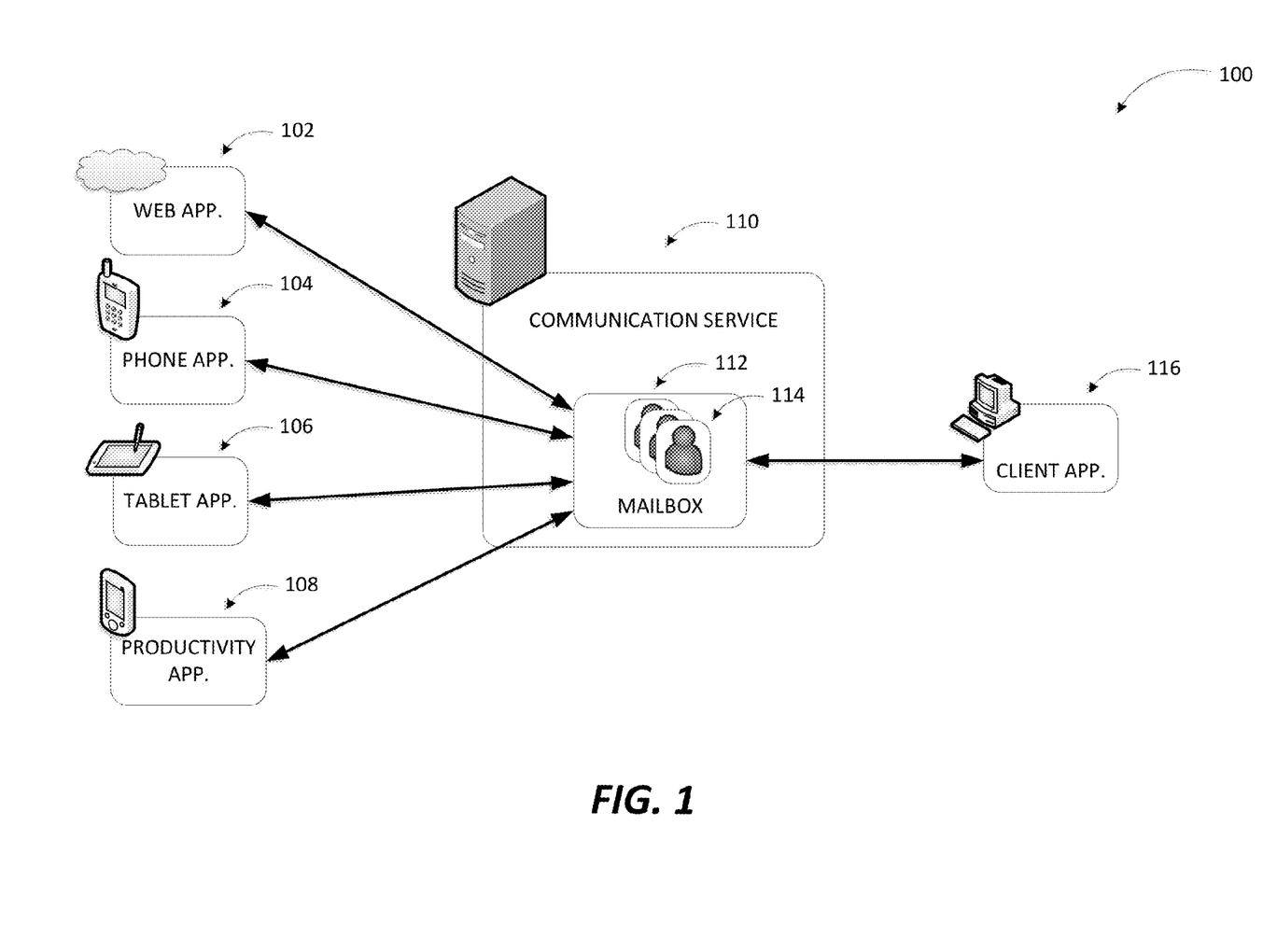
FIG. 1 is a conceptual diagram illustrating a basic example of how links between different applications may be roamed in a system persisting contact information in a mailbox.

FIG. 1 include conceptual diagram 100 illustrating a basic example of how links between different applications may be roamed in a system persisting contact information in a mailbox.

A system according to embodiments is directed to aggregating multiple contacts from different sources into a unified profile view through contact linking while addressing conflicting data, duplicates, etc. automatically. Contact linking and a logic person object for aggregated contact information may be preserved in a server-side mailbox as opposed to a client-side presentation layer for the user enabling efficient roaming through applications across different form factors and retrieval of contact information. If aggregation is performed at a presentation layer, the operations may need to be performed again each time the client device/application reconnects to the server or changes are made client-side. Additionally, the aggregated information (e.g., resolution of conflicts, duplicates, etc.) may be lost if the client-side data is lost or corrupted, client device is lost or damaged, and so on. A server-side mailbox, on the other hand, is usually backed up and secured through one or more mechanisms. Thus, not only is the aggregation process optimized, but the unified contact information is preserved in a secure manner. Additionally, a user may access the unified contact information through multiple devices/applications as opposed to having the information reside on one client device/application only.

As shown in diagram 100, communication service 110 may provide single or multi modal communication services such as email, text messaging, audio/video communications, whiteboard sharing, data sharing, application sharing, conferencing, and similar ones. Users may access the services through client application 116. Client application 116 may be a thin client or rich client. A thin client is typically a generic application such as a web browser that enables access to a hosted service through a user interface defined by the service and stores little or no data locally. A rich client is typically a special purpose application that may be installed locally on a client device and enable access to the same service with additional features storing some or all of the data also locally. In either case, connectivity is needed for the communications to be facilitated.

A contact is a collection of information about a person or entity that enables a user to establish different modes of communication with that person or entity, as well as view additional information. For example, a contact may include physical or email addresses, name, phone/fax numbers, text messaging id, social network id, and so on. A contact may also include ancillary information such as a person's title, organizational status, birthday, presence information (availability, location, etc.), and comparable data. Contacts may be created by various applications and services such as communication applications, social network services, even productivity applications that may provide multi-purpose services. Web application 102, phone application 104, tablet application 106, and productivity application 108 are examples of such applications that may have contact lists for a user. The contacts created by each application may have a different structure, content, or format.

A user may have a number of contact lists maintained at different applications, local or hosted. Some of the contact lists may include contact data for the same person or entity with duplicate or conflicting information. In a system according to embodiments, communication service 110 may roam the related applications (102, 104, 106, 108, etc.) retrieving contact information for a user of the service and create logic person objects 114 for each distinct contact in mailbox 112. While creating the logic person objects 114, the service may resolve conflicts and eliminate duplicate data such that unified contact view can be presented to the user through a user interface at the client application 116.

Figure 2:
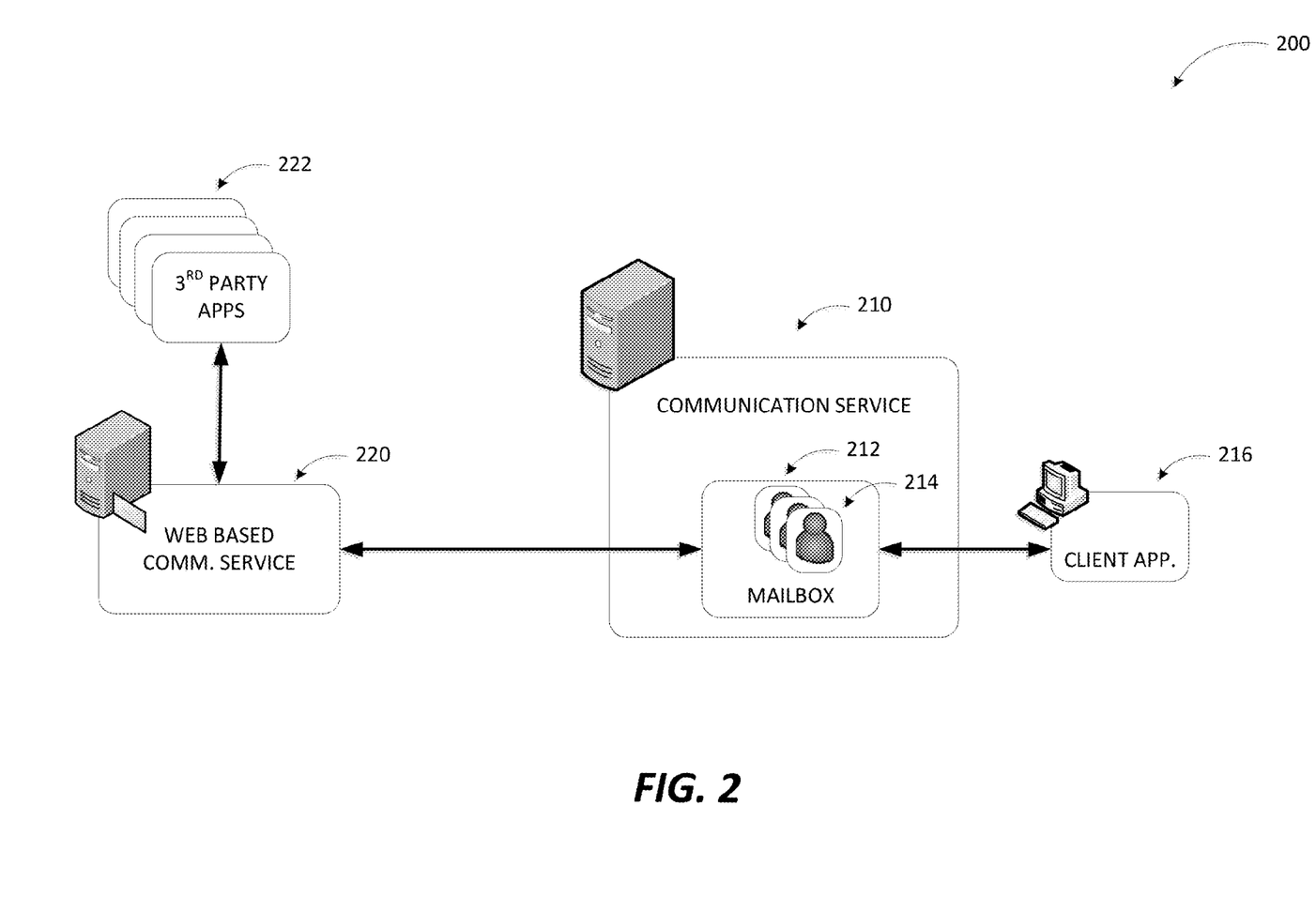
FIG. 2 illustrates another conceptual diagram illustrating an example of how contact data from third party applications may be retrieved in a system persisting contact information in a mailbox according to embodiments.

FIG. 2 illustrates another conceptual diagram illustrating an example of how contact data from third party applications may be retrieved in a system persisting contact information in a mailbox according to embodiments.

Diagram 200 shows another configuration, which may be implemented in combination with the configuration of FIG. 1. Communication service 210 may provide communication services to a user through client application 216 as discussed above. Some of the contact information for aggregation to logic person objects 214 in mailbox 212 for the user may include third party applications or services 222 outside the user's local or enterprise computing environment. Third party applications or service 222 may include social networking services, directories, professional networking services, search engines, and comparable ones. Communication service 210 may retrieve contact information (e.g., complete contact lists or individual contacts) from third party applications or services 222 through a web based communication service 220 (e.g., Exchange Web Services® by Microsoft Corp. of Redmond, Wash.) and aggregate along with locally retrieved contact information to logic person objects 214 in mailbox 212.

Thus, a system according to embodiments enables centralization of different data sources in the mailbox 212, thus increasing the likelihood to enhance linking capability (find more duplicates, and provide enhanced unified views). For example, data from a corporate directory may be leveraged to ensure the user does not see someone they have in their contacts twice in search results if the contact exists in the company directory.

Figure 3:
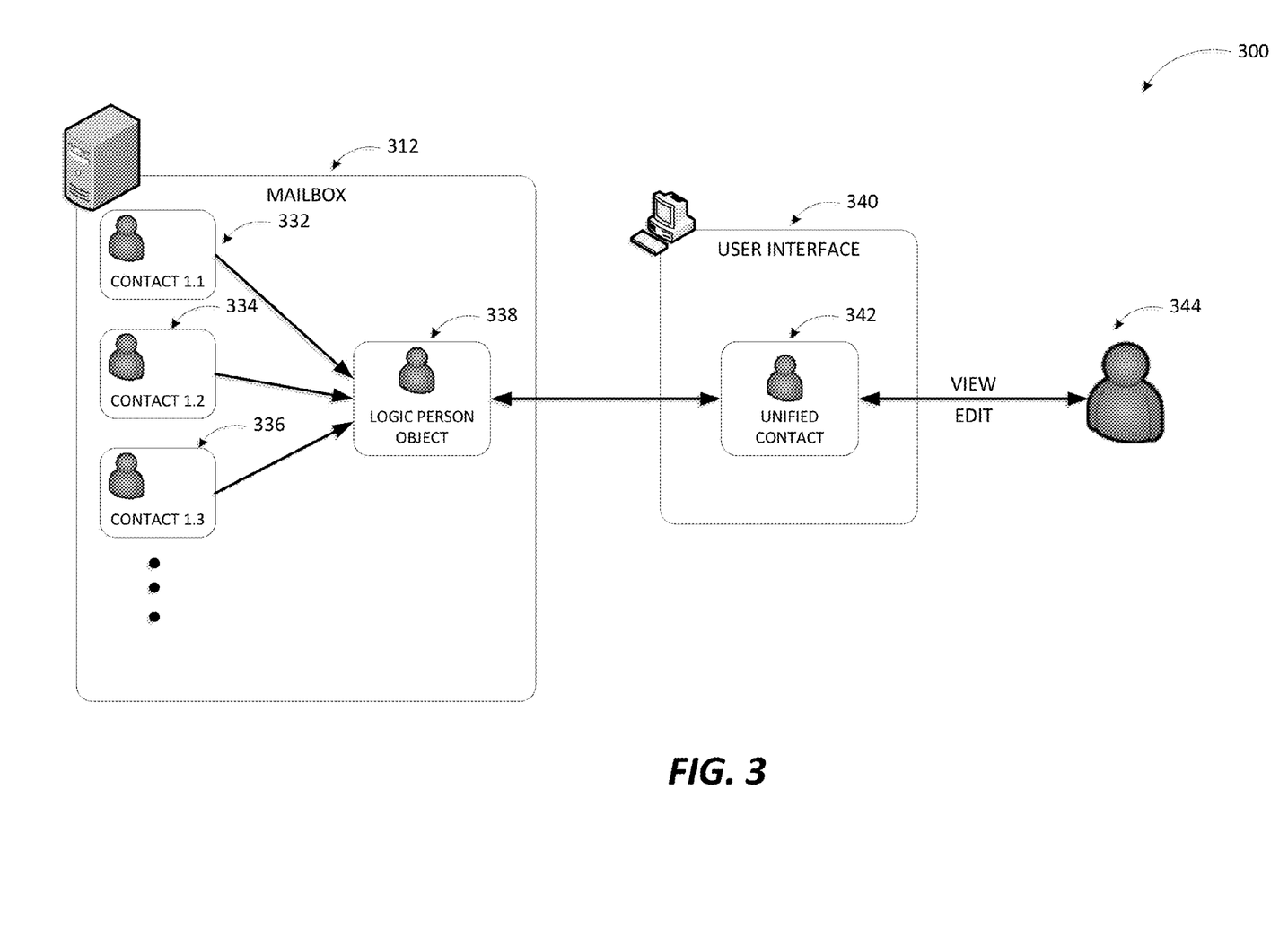
FIG. 3 illustrates use of a logic person object and unified contact view in aggregating contacts in a system according to embodiments.

FIG. 3 illustrates use of a logic person object and unified contact view in aggregating contacts in a system according to embodiments. Diagram 300 shows conceptual aggregation of different linked contacts 332, 334, and 336 into a logic person object 338 in mailbox 312. Contact data, communication heuristics, corporate directory meta-data, instant messaging data, etc. may be leveraged in linking the contacts 332, 334, and 336. By centralizing the solution in the mailbox 312, redundancy and manual work by the user may be substantially reduced. By preserving the linked contacts and logic person object(s) in the mailbox 312, resilience of contact linking data may be accomplished against loss or corruption.

Since there is typically a high-availability story for the mailbox, the data is usually backed up and available in case of catastrophic failure.

User interface 340 at a client application may be employed to present a unified contact view 342 based on the logic person object 338 to user 344. Using the mailbox enables making the results of contact linking searchable. Search results may accrue the value of de-duplication and unified views. Using the mailbox further enables use of communication patterns to inform linking In addition to data matching and conforming to an algorithm, communication patterns may be employed as a heuristic to inform their relevance. Moreover, a consistent user experience may be enabled because by using a mailbox schema for contacts to store the linking information, consistency may be enforced in the information architecture in various presentation scenarios such as address book browsing, recipient well (email, calendar) scenarios, search results, and similar ones.

A storage model according to embodiments may support abstraction of multiple contacts into a logic person object enabling introduction of aggregate contact management and communication. The user may perform edit operations (in addition to viewing unified contacts) without having to think about which contact he/she is working with. The contacts are linked together and the system determines where to put the changes.

While the example communication applications, services, and platforms discussed in FIG. 1 through 3 may be an email service, embodiments are not limited to an email service. Embodiments may be implemented in any application that facilitates real time or asynchronous communications such as Voice over Internet Protocol (VOIP) telephony, text messaging, video conferencing, application sharing, and comparable ones using the principles described herein.

Figure 4:
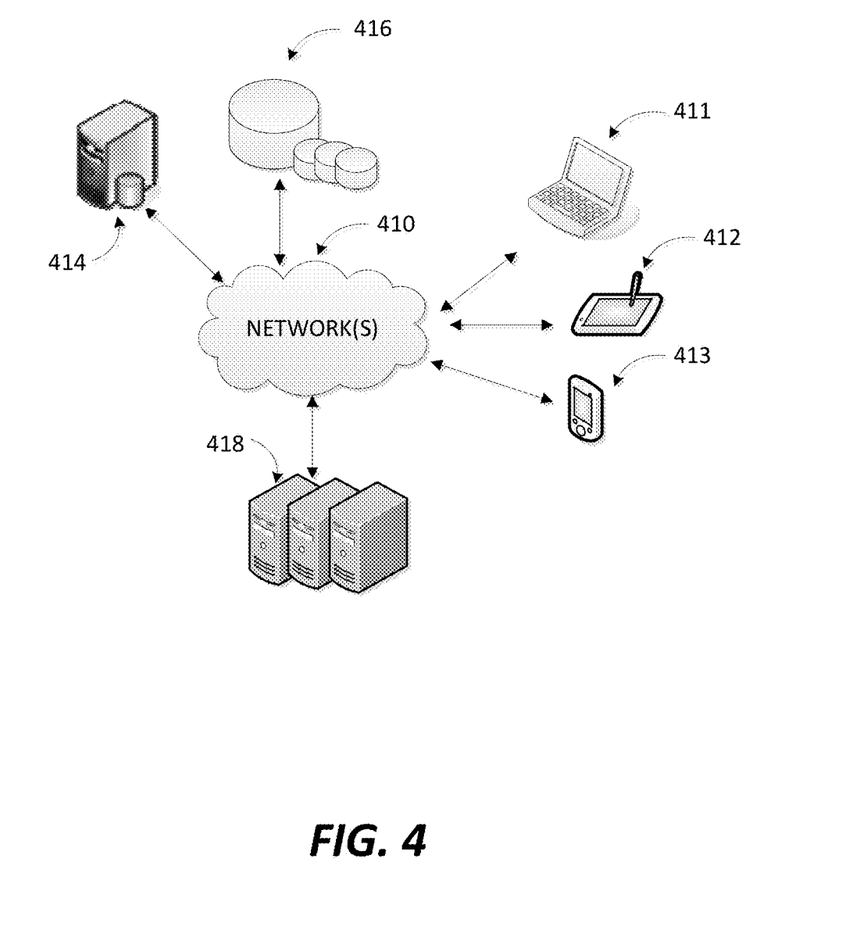
FIG. 4 is a networked environment, where a system according to embodiments may be implemented.

FIG. 4 is an example networked environment, where embodiments may be implemented. A communication service persisting contact information in a logic person object within a mailbox may be implemented via software executed over one or more servers 418 such as a hosted service. The service may facilitate communications between client applications on individual computing devices such as a smart phone 413, a tablet computer 412, laptop computer 411, and a desktop computer (client devices') through network(s) 410.

As discussed, the communication service may aggregate multiple contacts into a unified profile view through contact linking to a logic person object that is persisted in a mailbox addressing conflicting data, duplicates, etc. By using a server-maintained mailbox as a storage model and as the contact linking system, roaming solution across form factors (mobile, slate, PC, etc.) may be provided.

Client devices 411-413 are used to facilitate communications through a variety of modes between users of the communication application. One or more of the servers 418 may be used to manage contact information as discussed above. Contact information may be stored in one or more data stores (e.g. data store 416), which may be managed by any one of the servers 418 or by database server 414.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to persist aggregated contact information in a mailbox. Furthermore, the networked environments discussed in FIG. 4 are for illustration purposes only. Embodiments are not limited to the example applications, modules, or processes.

Figure 5:
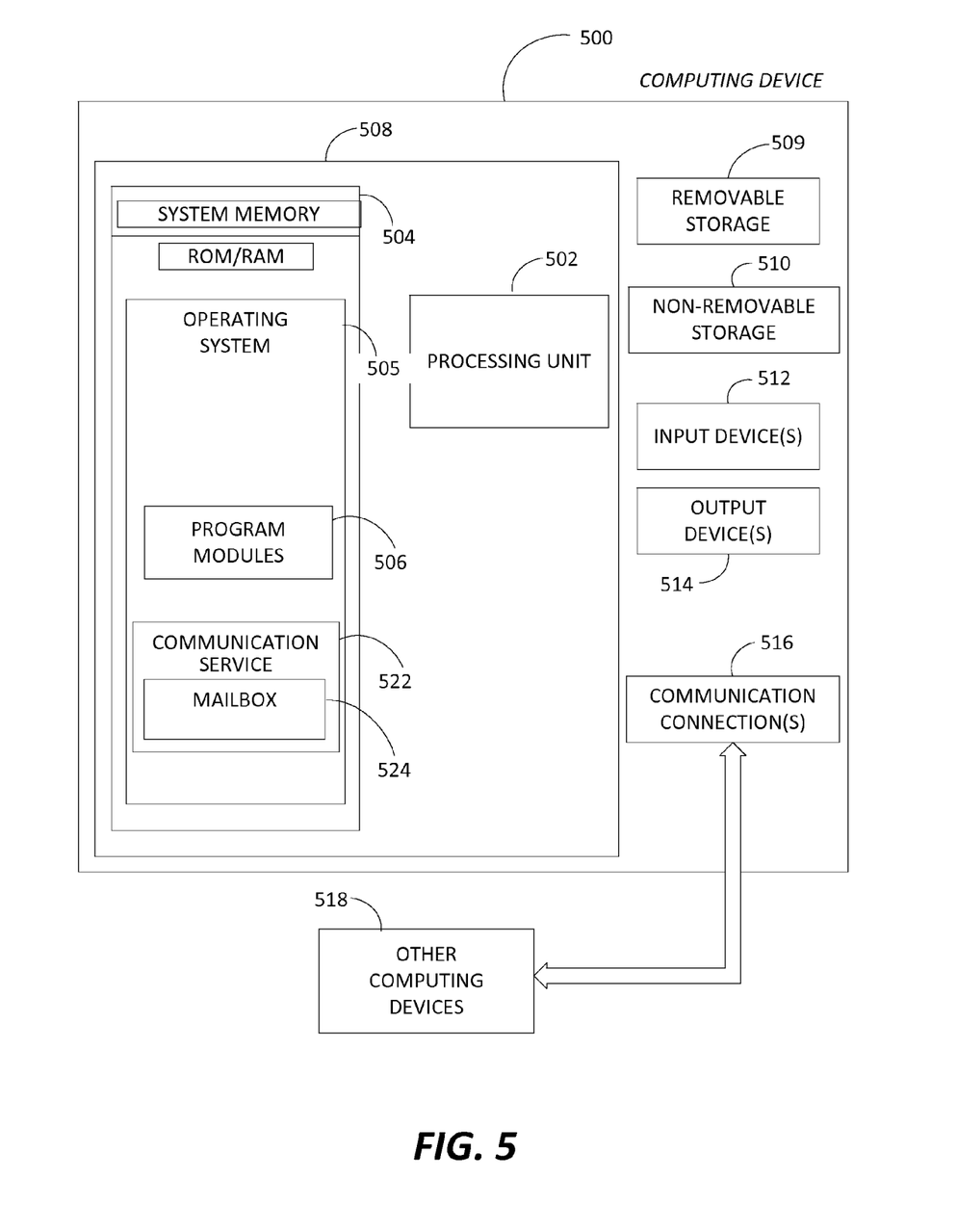
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server as part of a communication system and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS®, operating systems from MICROSOFT CORPORATION of Redmond, Wash. The system memory 504 may also include one or more software applications such as program modules 506, communication service 522, and mailbox 524.

Communication service 522 may be a single hosted application or a collection of hosted and/or locally installed applications providing single or multi-modal communication services to users through rich or thin clients. As part of the facilitated services, communication service 522 may retrieve contact information from a variety of sources and aggregate into a logic person object that is persisted in mailbox 524 for a user. The logic person object and the linked contact may be maintained at the mailbox 524 allowing elimination of redundancy and manual operations by the user. A unified contact view may be provided through a user interface based on the logic person object. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices.

Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
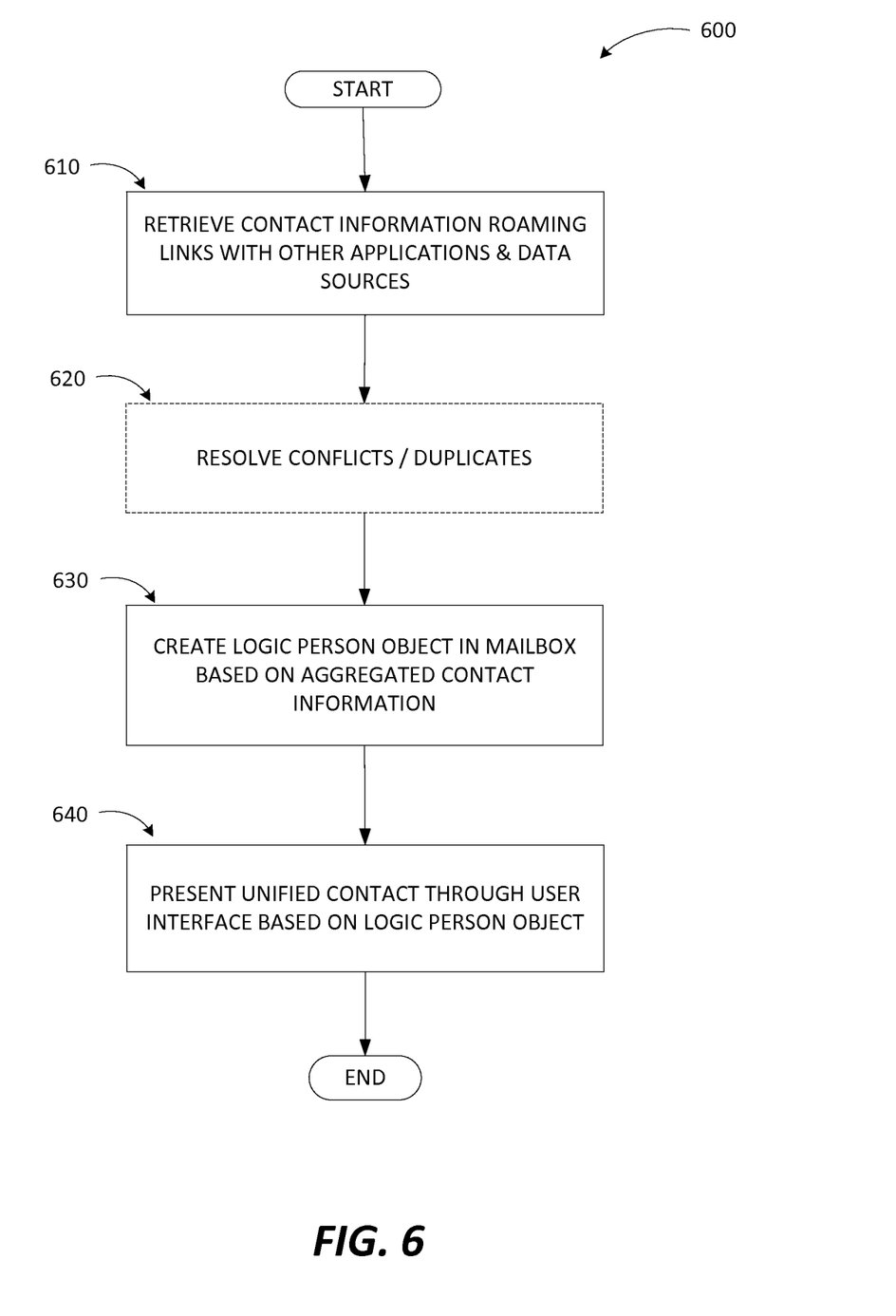
FIG. 6 illustrates a logic flow diagram for a process of persisting contact information in a mailbox according to embodiments.

FIG. 6 illustrates a logic flow diagram for a process of persisting contact information in a mailbox according to embodiments. Process 600 may be implemented as part of a communication application that maintains contact information.

Process 600 begins with operation 610, where contact information may be retrieved roaming links with other local or hosted applications, services, and other data sources. Heuristics, metadata, communication patterns, and similar data may be employed in gathering contact information and resolving conflicts and duplications at operation 620. At operation 630, a logic person object may be created for each contact person or entity based on the aggregated contact information. The linked contacts and the logic person objects may be preserved at a mailbox of the communication service for the user enabling not only efficient aggregation operations, but also implementation of security and redundant storage mechanisms. At operation 640, a unified contact view may be presented to a user through a user interface of a client application based on the logic person object. The user may be enabled to edit contact information through the unified view affecting the logic person object and linked contacts in the mailbox.

The operations included in process 600 are for illustration purposes. A communication application persisting contact information in a mailbox according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for persisting unified contact information in a mailbox, the method comprising:
   retrieving contact information from a plurality of internal and external data sources through a communication service, the contact information including name, address, telephone number, user id, email address, status, position, title, presence information, availability and location;
   determining a relevance of each contact based on the contact information, communication heuristics, corporate directory meta-data, and messaging data in linking contacts;
   aggregating the retrieved contact information by linking the contacts with a logic person object employing communication patterns as a heuristic, wherein the linked contacts and the logic person object are persisted in a mailbox of the communication service;
   presenting a unified contact view to a user through a user interface of a client application associated with the communication service based on the logic person object;
   enabling the user to edit the aggregated contact information through the unified contact view; and
   modifying the logic person object and at least one linked contact based on the edited contact information.

2. The method of claim 1, further comprising:
   aggregating the retrieved contact information by automatically resolving conflicts and eliminating duplicate information.

3. The method of claim 1, wherein the contact information is retrieved from one of a hosted application and a local application.

4. The method of claim 3, wherein the local application and the hosted application include at least one from a set of: a phone application, a slate application, a directory, and a productivity application.

5. The method of claim 1, further comprising:
   retrieving the contact information from at least one service through a web based communication service.

6. The method of claim 5, wherein the at least one service includes one or more of: a social network service, a professional network service, a directory service, and a search engine.

7. The method of claim 1, further comprising:
   leveraging at least one from a set of: contact data, communication heuristics, corporate directory meta-data, and messaging data in linking the contacts.

8. The method of claim 1, further comprising:
   enabling resilience of contact linking data against one of loss and corruption by implementing redundancy and security mechanisms for the mailbox.

9. The method of claim 1, further comprising:
   employing at least one of a data matching algorithm in linking the contacts.

10. The method of claim 1, wherein the unified contact view is made available to the user through a plurality of client devices and client applications.

11. The method of claim 1, wherein the client application is one of a thin client and a rich client associated with the communication service.

12. A communication server for persisting unified contact information in a mailbox, the server comprising:
a memory storing a communication service;
a processor coupled to the memory, the processor executing the communication service, wherein the communication service is configured to:
retrieve contact information from a plurality of local and hosted sources;
determine a relevance of each contact based on contact data, communication heuristics, corporate directory meta-data, and messaging data in linking contacts;
aggregate the retrieved contact information by abstracting a plurality of contacts into a logic person object employing automatic conflict resolution, duplicate elimination, and at least one from a set of: a communication pattern associated with a user, contact meta-data, and a heuristic, wherein the abstracted contacts and the logic person object are persisted in a server-side mailbox associated with the user;
present a unified contact view to the user through a user interface of a client application associated with the communication service based on the logic person object;
enable the user to edit the aggregated contact information through the unified contact view; and
modify the logic person object and at least one affected contact based on the edited contact information.

13. The server of claim 12, wherein the communication service is further configured to:
render results of contact aggregation searchable.

14. The server of claim 13, wherein the search results accrue a value of de-duplication and unified contact views.

15. The server of claim 12, wherein the communication service is configured to facilitate at least one from a set of: email exchange, text message exchange, audio communication, video communication, whiteboard sharing, data sharing, application sharing, and conferencing.

16. A computer-readable memory device including removable and non-removable storage media with instructions stored thereon for persisting unified contact information in a mailbox, the instructions when executed, perform operations including:
retrieving contact information from a plurality of sources through a communication service executed on a server;
determining a relevance of each contact based on contact data, communication heuristics, corporate directory meta-data, and messaging data in linking contacts;
automatically resolving conflicts and eliminating duplicate information among the retrieved contact information at the server;
aggregating the retrieved contact information by linking the contacts with a logic person object, wherein the linked contacts and the logic person object are persisted in a mailbox of the communication service at the server, and wherein a communication pattern is employed at the mailbox to inform of the linked contacts and to inform the relevance of the linked contacts;
presenting a unified contact view to a user through a user interface of a client application executed on a client device associated with the communication service based on the logic person object;
enabling the user to edit the aggregated contact information through the unified contact view; and
modifying the logic person object and at least one linked contact based on the edited contact information.

17. The computer-readable memory device of claim 16, wherein the operations further comprise:
enabling consistent user experience by employing a mailbox schema for contacts to store linking information and enforcing consistency in an information architecture of a unified contact view presentation.

18. The computer-readable memory device of claim 17, wherein the unified contact view presentation includes at least one from a set of: address book browsing, a recipient well, and search result presentation.

* * * * *